(12) United States Patent
Storc et al.

(10) Patent No.: US 7,114,769 B2
(45) Date of Patent: Oct. 3, 2006

(54) AUTOMOTIVE VEHICLE OPEN AIR SYSTEM

(75) Inventors: Robert G. Storc, Rochester Hills, MI (US); James E. Robertson, Rochester, MI (US); Arthur L. MacNee, III, Southgate, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 11/154,445

(22) Filed: Jun. 16, 2005

(65) Prior Publication Data

US 2005/0280291 A1 Dec. 22, 2005

Related U.S. Application Data

(60) Provisional application No. 60/580,583, filed on Jun. 17, 2004.

(51) Int. Cl.
*B60J 7/06* (2006.01)
*B60R 21/06* (2006.01)

(52) U.S. Cl. .................. 296/219; 296/24.43; 280/749

(58) Field of Classification Search ............. 296/219, 296/98, 24.4, 24.43, 107.15, 107.19; 280/749
See application file for complete search history.

(56) References Cited

U.S. PATENT DOCUMENTS

| | | | |
|---|---|---|---|
| 1,910,075 A | 5/1933 | Westad | |
| 2,042,431 A | 6/1936 | Hooper | |
| 2,103,372 A | 12/1937 | Lange | |
| 2,580,337 A | 12/1951 | Votypka | |
| 2,985,483 A | 5/1961 | Bishop et al. | |
| 3,174,794 A * | 3/1965 | Moynihan, Jr. | 296/219 |
| 3,298,731 A | 1/1967 | Sangimino | |
| 3,953,067 A | 4/1976 | Isola | |
| 3,960,404 A | 6/1976 | Bienert | |
| 4,063,774 A | 12/1977 | Hanks | |
| 4,227,739 A | 10/1980 | Sorensen | |
| 4,272,121 A | 6/1981 | Kim | |
| 4,371,204 A | 2/1983 | George et al. | |
| 4,630,858 A | 12/1986 | Bez | |
| 4,644,699 A | 2/1987 | Chandler et al. | |
| 4,968,090 A | 11/1990 | Schleicher et al. | |
| 5,121,958 A | 6/1992 | Goeden et al. | |
| 5,141,283 A | 8/1992 | Omoto et al. | |
| 5,152,577 A | 10/1992 | Omoto et al. | |
| 5,169,206 A | 12/1992 | Omoto et al. | |

(Continued)

FOREIGN PATENT DOCUMENTS

DE 0774371 11/1996

(Continued)

OTHER PUBLICATIONS 16 color photographs of the rear roof movement of a 1965 Studebaker Wagonaire, offered for sale and publicly used in 1965.

(Continued)

*Primary Examiner*—Dennis H. Pedder
(74) *Attorney, Agent, or Firm*—Harness, Dickey & Pierce, P.L.C.

(57) ABSTRACT

In accordance with the present invention, an open air system for a motor vehicle includes a forward flexible roof portion with a pair of tracks, a rear flexible roof portion with a pair of tracks, a seal between the forward and rear roof portions, at least one movement mechanism and at least one actuator. Other aspects of the present invention include forming a barrier with the rear roof section between a passenger area and a cargo area of a vehicle.

29 Claims, 17 Drawing Sheets

U.S. PATENT DOCUMENTS

| | | | |
|---|---|---|---|
| 5,385,774 A * | 1/1995 | Cramer et al. ............... | 442/229 |
| 5,540,478 A | 7/1996 | Schüch | |
| 5,551,197 A | 9/1996 | Repp et al. | |
| 5,704,173 A | 1/1998 | Repp et al. | |
| 5,746,475 A | 5/1998 | Caye et al. | |
| 5,934,727 A | 8/1999 | Storc et al. | |
| 5,944,378 A | 8/1999 | Mather et al. | |
| 6,010,180 A | 1/2000 | Bureau et al. | |
| 6,033,012 A * | 3/2000 | Russke et al. ............... | 296/219 |
| 6,119,760 A | 9/2000 | Poole | |
| 6,217,096 B1 | 4/2001 | Koiwa et al. | |
| 6,305,740 B1 | 10/2001 | Staser et al. | |
| 6,325,436 B1 | 12/2001 | Ehrenberger et al. | |
| 6,340,204 B1 | 1/2002 | Seifert | |
| 6,345,859 B1 | 2/2002 | Thomas | |
| 6,416,104 B1 | 7/2002 | Fisher et al. | |
| 6,428,090 B1 | 8/2002 | Reinsch | |
| 6,454,346 B1 | 9/2002 | Nabuurs | |
| 6,478,355 B1 | 11/2002 | Van Eden et al. | |
| 6,478,368 B1 | 11/2002 | de Gaillard | |
| 6,485,094 B1 | 11/2002 | Corder et al. | |
| 6,494,528 B1 | 12/2002 | Tolinski et al. | |
| 6,497,448 B1 | 12/2002 | Curtis et al. | |
| 6,517,135 B1 | 2/2003 | de Gaillard | |
| 6,520,570 B1 | 2/2003 | Schätzler | |
| 6,568,732 B1 | 5/2003 | de Gaillard | |
| 6,604,782 B1 | 8/2003 | de Gaillard et al. | |
| 6,634,699 B1 | 10/2003 | Collins et al. | |
| 6,672,638 B1 | 1/2004 | Corder et al. | |
| 6,783,172 B1 | 8/2004 | de Gaillard | |
| 6,860,549 B1 | 3/2005 | Engelgau | |
| 6,866,335 B1 | 3/2005 | Tolinski et al. | |
| 6,899,382 B1 | 5/2005 | Engelgau | |
| 2002/0089204 A1 | 7/2002 | Fisher et al. | |
| 2003/0085594 A1 | 5/2003 | Engelgau | |
| 2004/0017097 A1 | 1/2004 | Albert et al. | |
| 2004/0051347 A1 | 3/2004 | Manders et al. | |
| 2005/0110304 A1 | 5/2005 | Engelgau | |
| 2005/0134096 A1 | 6/2005 | Fallis, III et al. | |

FOREIGN PATENT DOCUMENTS

| | | |
|---|---|---|
| FR | 0466529 | 1/1992 |
| GB | 2184404 | 6/1987 |

OTHER PUBLICATIONS 2 factory photographs of a 1963 Studebaker Wagonaire, published 1963.

1 copy of a blueprint of the roof assembly for the Studebaker Wagonaire, published, offered for sale and/or publicly used about 1963.

2 web pages illustrating a 2004 GMC Envoy XUV with an opened roof, offered for sale in 2004.

Webasto Hollandia 400 brochure, 2 pages, published 2003.

Webasto sliding sunroof and headliner restoration on a 1959 Mercedes-Benz Type 220S Ponton sedan, 16 pages, published Aug. 7, 2002.

* cited by examiner

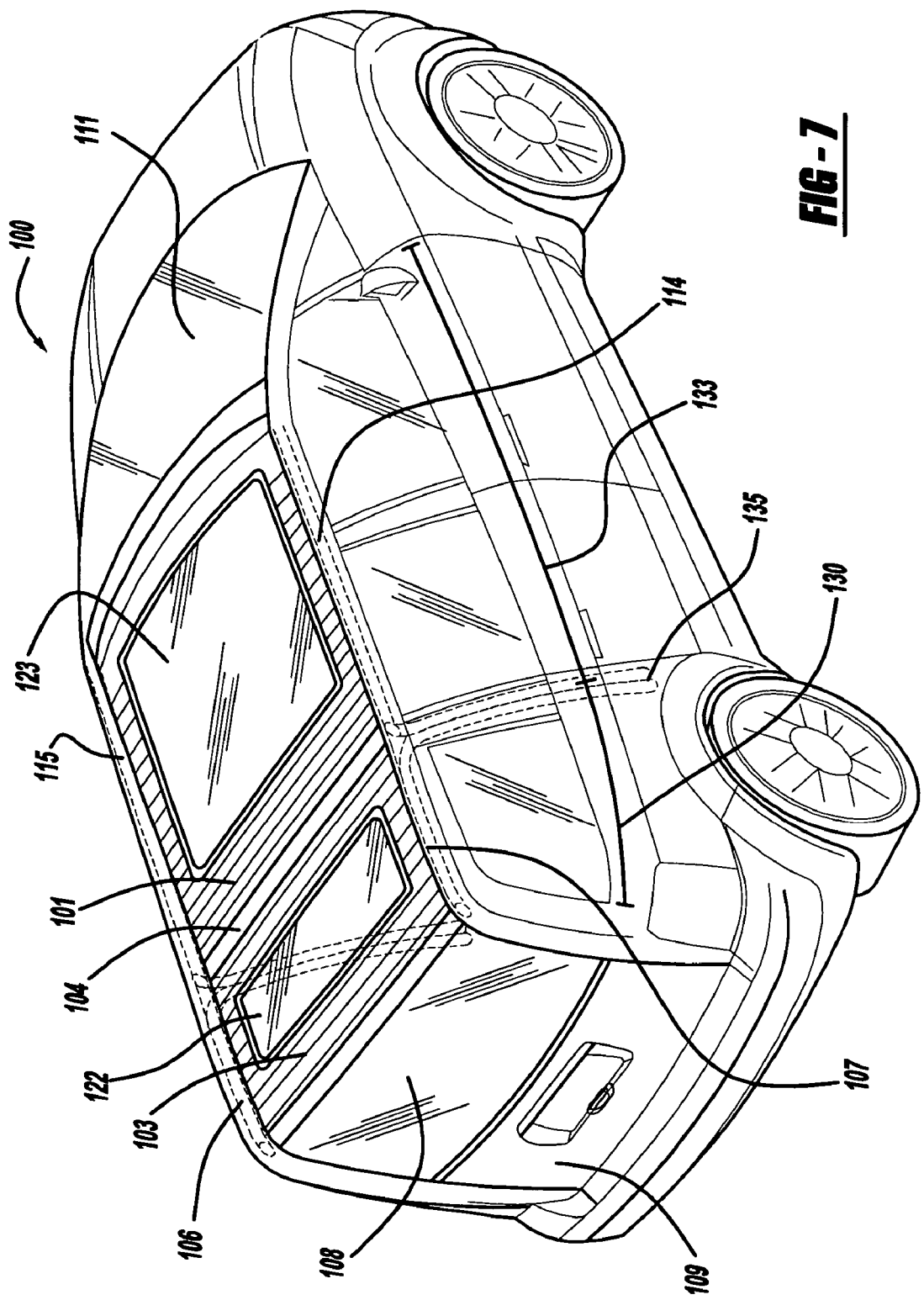

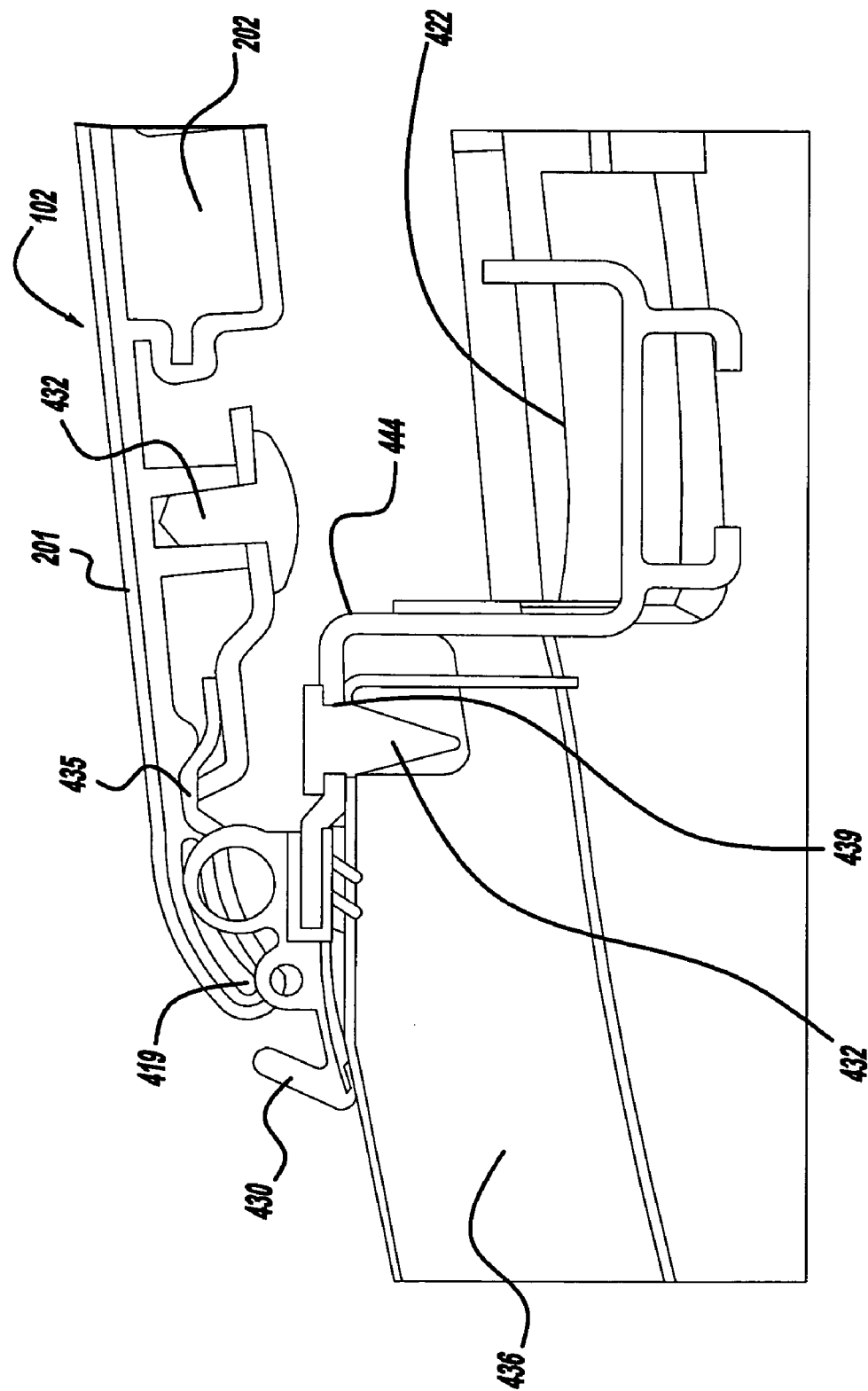

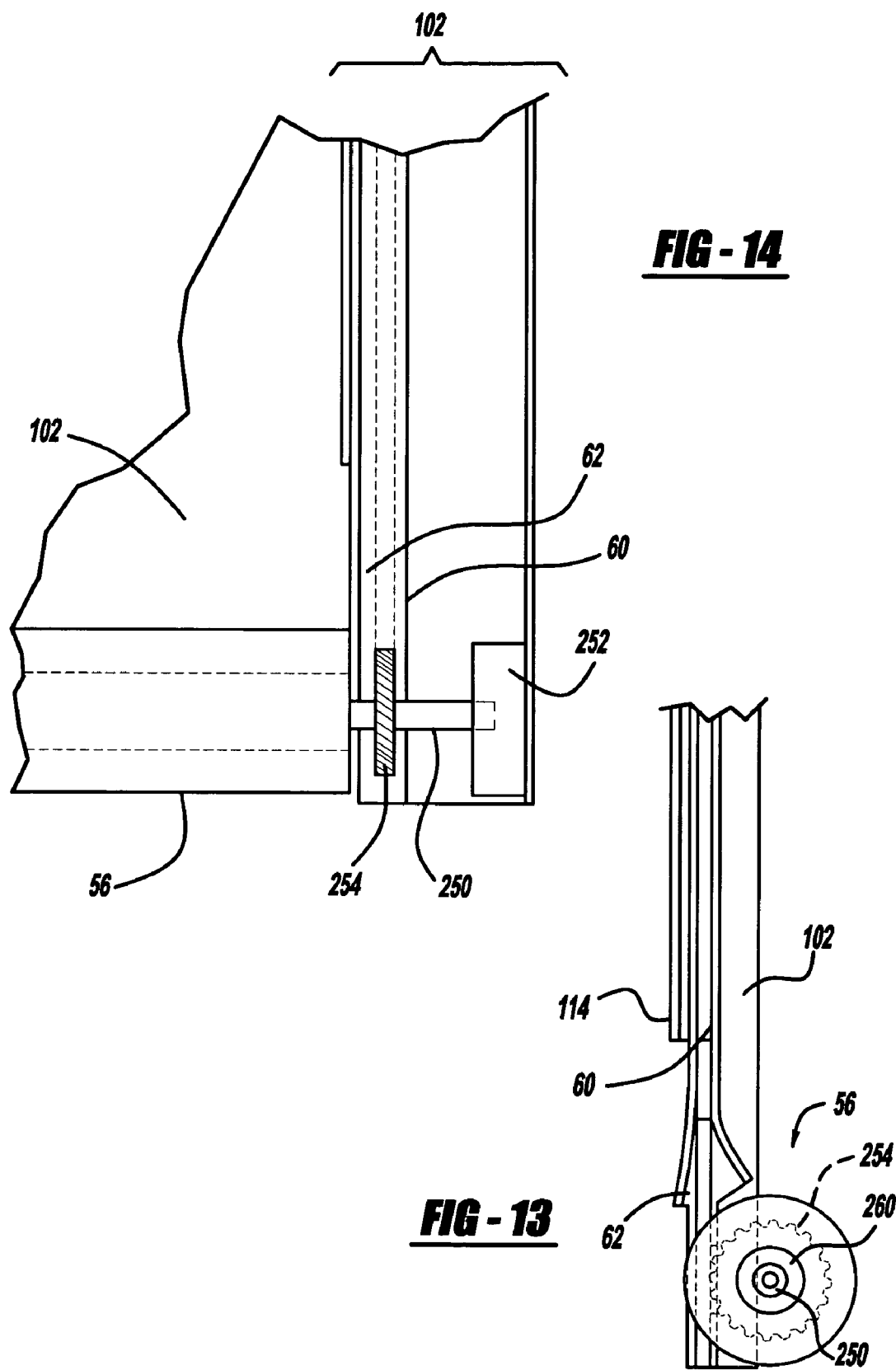

AUTOMOTIVE VEHICLE OPEN AIR SYSTEM

CROSS-REFERENCE TO RELATED APPLICATIONS

This application claims the benefit of U.S. Provisional Application Ser. No. 60/580,583 to Storc et al., filed on Jun. 17, 2004. The disclosure of the above application is incorporated herein by reference.

FIELD OF THE INVENTION

The present invention relates generally to automotive vehicles and, more particularly, to moveable flexible roof for use in an automotive vehicle.

BACKGROUND AND SUMMARY

It is known to employ flexible roof covers for automotive vehicles. For example, a flexible roof cover can be retracted by winding it around a spring loaded roller and such designs are disclosed in U.S. Pat. No. 1,245,278 to Sherman issued Nov. 6, 1917. More recent variations of single and flexible sunroof covers are disclosed in U.S. Pat. No. 5,152,577 to Omoto et al. issued Oct. 6, 1992; U.S. Pat. No. 5,944,378 to Mather et al. issued Aug. 31, 1999; and U.S. Patent Application Publication 2004/0017097 to Albert et al. issued Jan. 29, 2004.

Various attempts have also been made to allow vertical and rear accessibility to a storage compartment in an otherwise enclosed vehicle. Such designs are disclosed in U.S. Pat. No. 6,478,368 to de Gaillard issued Nov. 12, 2002; and U.S. Pat. No. 6,485,094 to Corder et al. issued Nov. 26, 2002. In addition, trucks that have interiors that are adaptable to various configurations to increase cargo space. Such designs are disclosed in U.S. Pat. No. 5,934,727 to Storc et al. issued Aug. 10, 1999; U.S. Pat. No. 6,478,355 to Van Eden et al. issued Nov. 12, 2002; and U.S. Patent Application Publication No. 20020089204 to Fisher published Jul. 11, 2002, as well as is currently available in the GMC Envoy XUV. Although the above patents solve some of the problems in the art, they are limited in the application for the class of automotive vehicle known as sport utility vehicles (SUV)

In accordance with the present invention, an open air system for a motor vehicle includes a forward flexible roof portion with a pair of tracks, a rear flexible roof portion with a pair of tracks, a seal between the forward and rear roof portions, at least one movement mechanism and at least one actuator. Other aspects of the present invention include forming a barrier with the rear roof section between a passenger area and a cargo area of a vehicle.

BRIEF DESCRIPTION OF THE DRAWINGS

The present invention will become more fully understood from the detailed description and the accompanying drawings, wherein:

FIG. 7 is a rear perspective view of a vehicle showing a second preferred embodiment of an open air system.

FIG. 11 is a cross sectional view of FIG. 1 along line 11—11 showing a preferred embodiment of the front roof header area.

FIG. 13 is a side diagrammatic view showing a preferred embodiment of roller system and movement of flexible roof.

FIG. 14 is a fragmentary top elevated view of a preferred embodiment of roller system and movement of flexible roof.

It should be noted that these figures are intended to exemplify the general characteristics of the invention for the purpose of the description of such embodiments herein. These figures may not precisely reflect the characteristics of any given embodiment and is not necessarily intended to define or limit specific embodiments within the scope of this invention.

DETAILED DESCRIPTION OF THE PREFERRED EMBODIMENTS

The following description of the preferred embodiments is merely exemplary in nature and is in no way intended to limit the invention, its application, or uses. The present invention provides devices and methods related to open air roof systems for automotive vehicles. The following definitions and non-limiting guidelines must be considered in reviewing the description of this invention set forth herein.

The citation of references herein does not constitute an admission that those references are prior art or have any relevance to the patentability of the invention disclosed herein. Any discussion of the content of references cited in the Introduction is intended merely to provide a general summary of assertions made by the authors of the references, and does not constitute an admission as to the accuracy of the content of such references. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations the stated of features.

Figure 1:
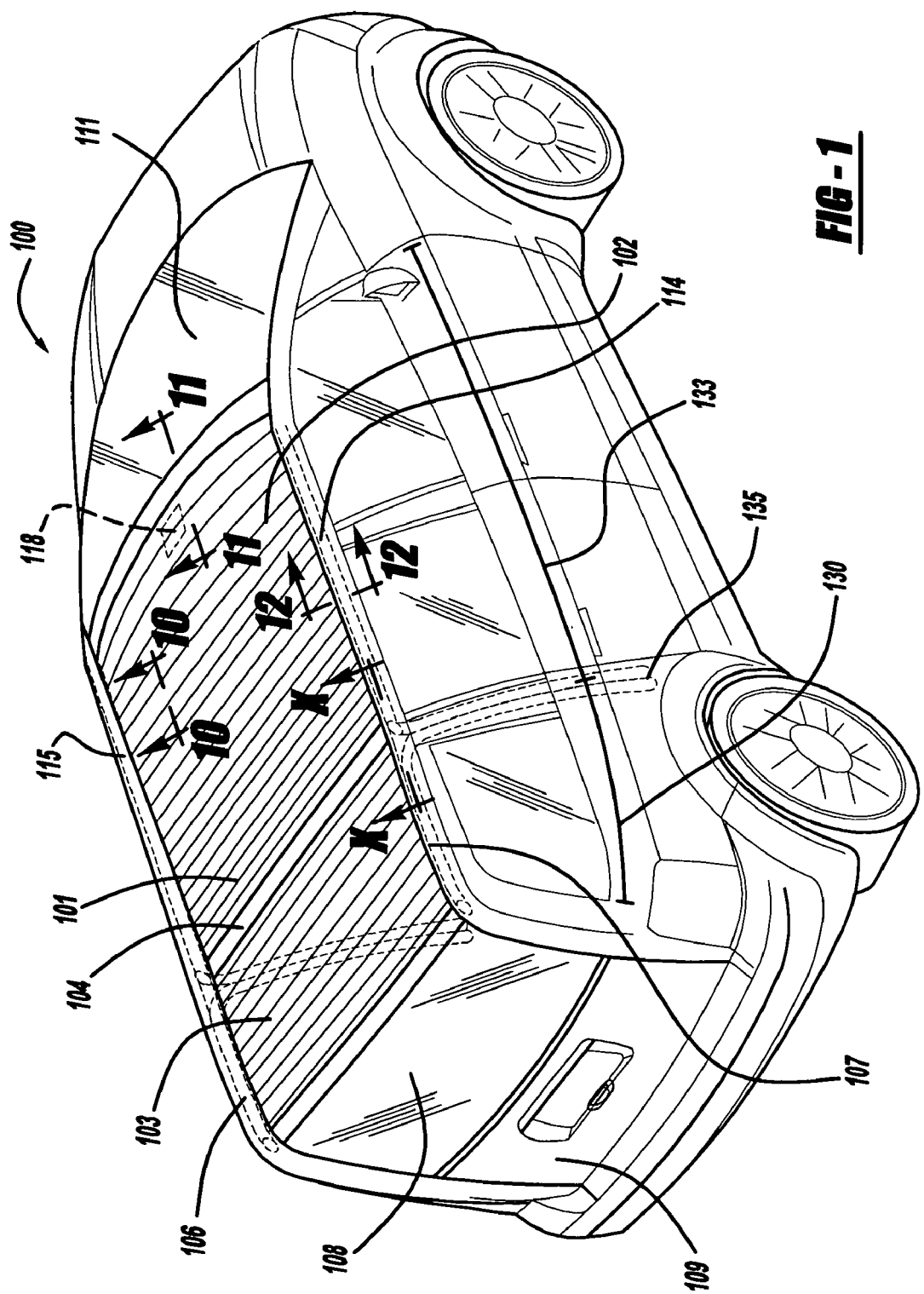
FIG. 1 is a rear perspective view of a vehicle showing a first preferred embodiment of open air system of the present invention.

Referring to FIG. 1, automotive vehicle 100 may be an SUV, a van or a mini-van. In preferred embodiments, open air system 101 spans the entire roof area of vehicle 100. Open air system 101 spans the entire length of the interior of the vehicle from the windshield 111 back to the rear window 108. Open air system 101 spans the entire width of the vehicle. Open air system 101 has two flexible, movable roof panels 102, 103. Front roof panel 102 is in the front spanning from the windshield to the C pillar and the rear roof panel 103, which spans from the C pillar to the D pillar. Front roof section 102 moves on a pair of parallel front tracks 114, 115. The front track 114 starts essentially at the windshield and continues along a straight path parallel to the ground to the C pillar then it curves and continues down the C pillar. The second front track 115 is a mirror image of first front track 114. A series of cross bows support the roof panel 102 and the ends of the cross bows are coupled to the front tracks 114, 115. Movement mechanisms are employed in the front tracks and are connected to the cross bow ends. These movement mechanisms may be a cable drive, a belt drive, a screw drive, a Bowden device or other drive devices. Movement mechanisms are controlled by an actuator or an electronic control unit. Roof panel movement may be controlled by a switch located within a comfortable reach of the driver of the vehicle. In an alternative embodiment, at the back edge of the front roof panel 102 is a seal which seals the area where front roof panel 102 and rear roof panel 103 meet. In preferred embodiments, cross car member 104 includes a water management system at the interface of cross car member 104 and roof panel 102.

Rear roof panel 103 spans from the C pillar to the D pillar and has a seal 120 which seals where it meets the rear window 108. Rear roof panel 103 is supported by cross bows and ends of the cross bows are coupled to rear tracks 106, 107. Rear track 107 begins at the D pillar where the seal 120 is located and continues along a straight path parallel to the ground to the C pillar then curves and continues down the C pillar parallel to track 114. The second rear track 106 is a mirror image of first rear track 107. Movement mechanisms are employed in the rear tracks and are coupled to the cross bow ends. These movement mechanisms may be a cable drive, a belt drive, a screw drive, a Bowden device or other drive devices.

Figure 2:
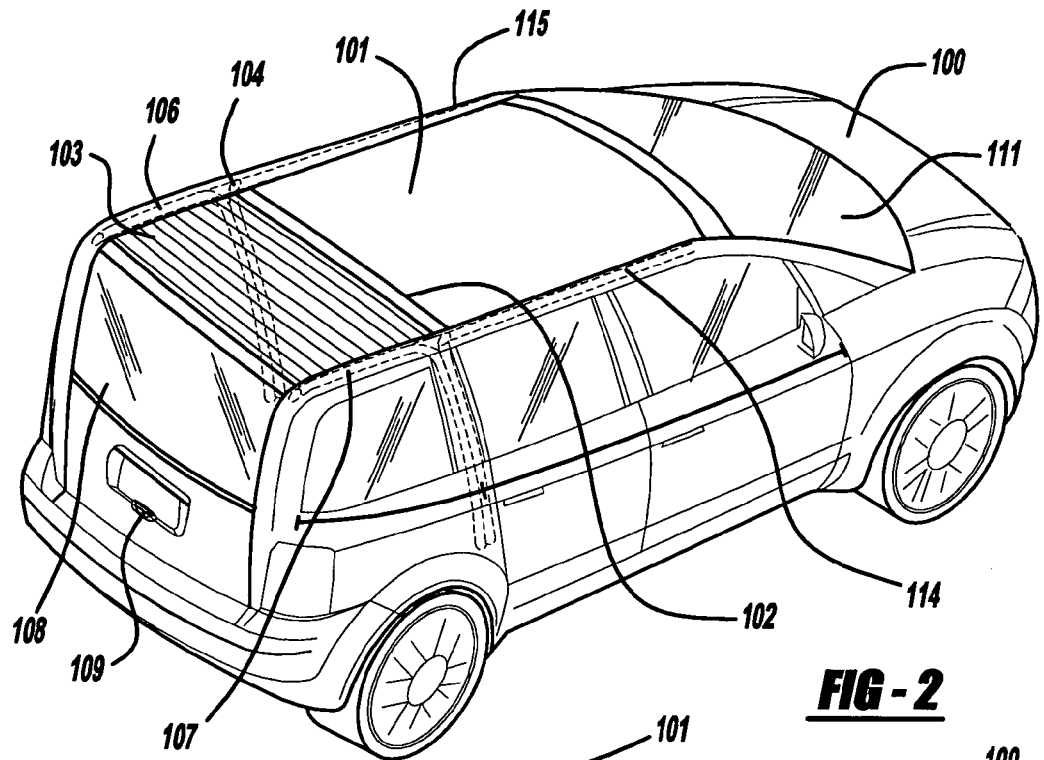
FIG. 2 is a rear perspective view of a vehicle showing a first preferred embodiment of the open air system with the roof open over the passenger compartment.

Referring to FIG. 2, the open air system 101 is shown with front roof panel 102 in an open position. When front roof panel 102 is open, the front and the rear passenger seats are exposed to the open air. The at least one movement mechanism operably moves the top of the front roof section 102. A roller mechanism 56 may be used so that front roof panel 102 may be rolled. Front roof panel 102 moves down the entire length of channels 115, 114 and is rolled at the end of the track. Rolled roof panel 102 may be located below a floor panel of the interior of the vehicle 100 and may include a door in the floor panel which may be used to conceal the rolled roof section.

Figure 3:
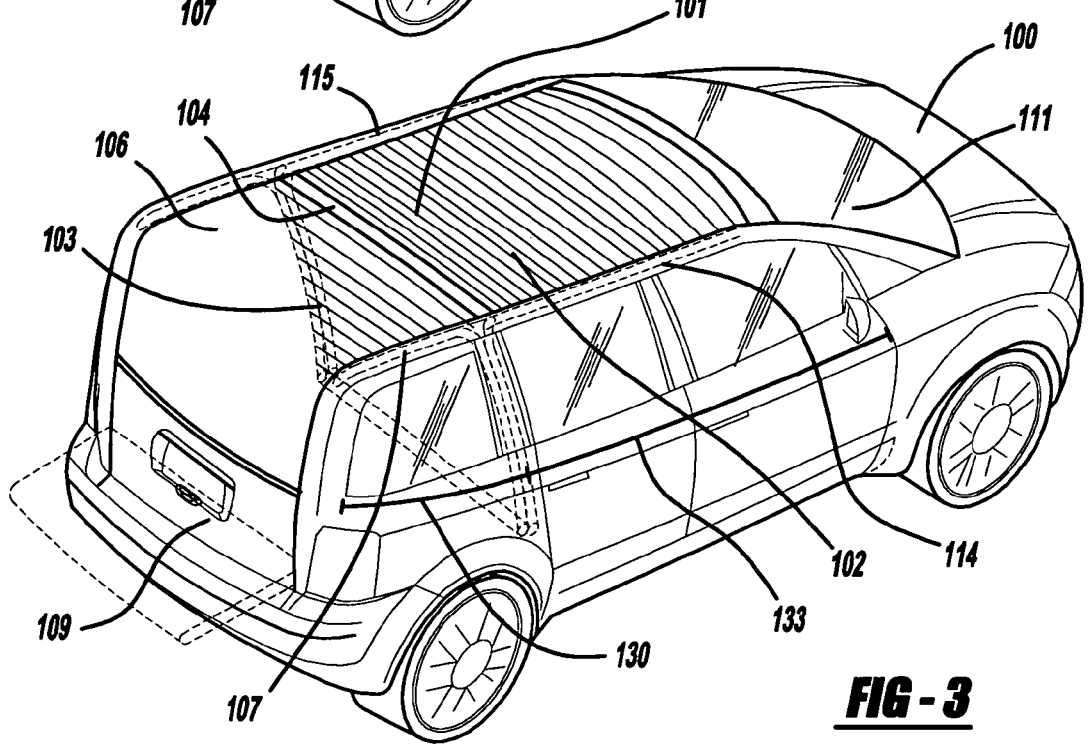
FIG. 3 is a rear perspective view of a vehicle showing a first preferred embodiment of open air system with the roof opened over an open cargo area.
Figure 4:
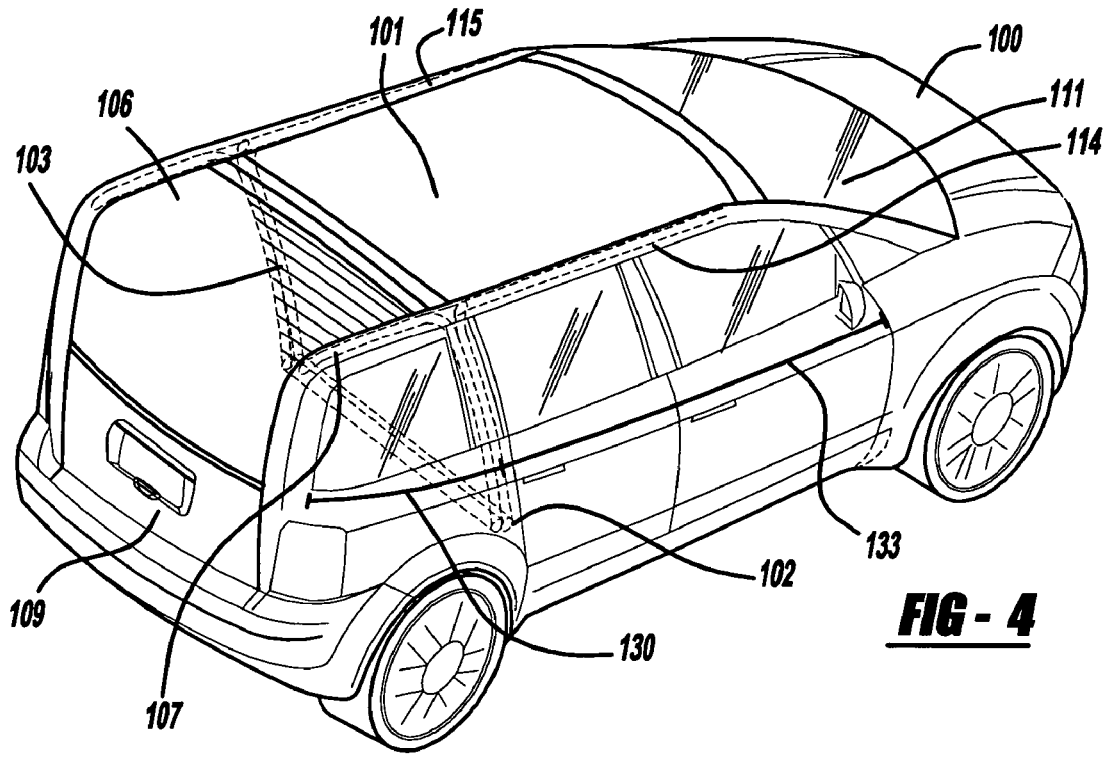
FIG. 4 is a rear perspective view of a vehicle showing a first preferred embodiment of open air system with an opened roof with a barrier between the passenger and cargo compartments.

Referring to FIG. 3, the vehicle 100 is shown with a rear roof section 103 in an open position and acting as a barrier between the cargo area 130 and the passenger area 133. In this embodiment, the barrier between the passenger 133 and the cargo areas 130 prevents outside elements such as rain, snow, wind, dirt, and other unwanted elements from entering the passenger compartment 133. In addition, the barrier allows the passenger compartment 133 to maintain a constant temperature via heating or air conditioning or combinations thereof so that the passengers and driver are comfortable. Furthermore, the barrier prevents cargo from entering the passenger area 133. Rear window 108 may be retracted into the tailgate 109. The tailgate 109 pivots so that cargo can be easily loaded into the vehicle 100. Referring to FIG. 4, this embodiment shows the vehicle 100 with the top front roof section 102 in an open position as shown in FIG. 1 and the rear roof portion 103 open and used as a barrier similar to FIG. 3.

Figure 5:
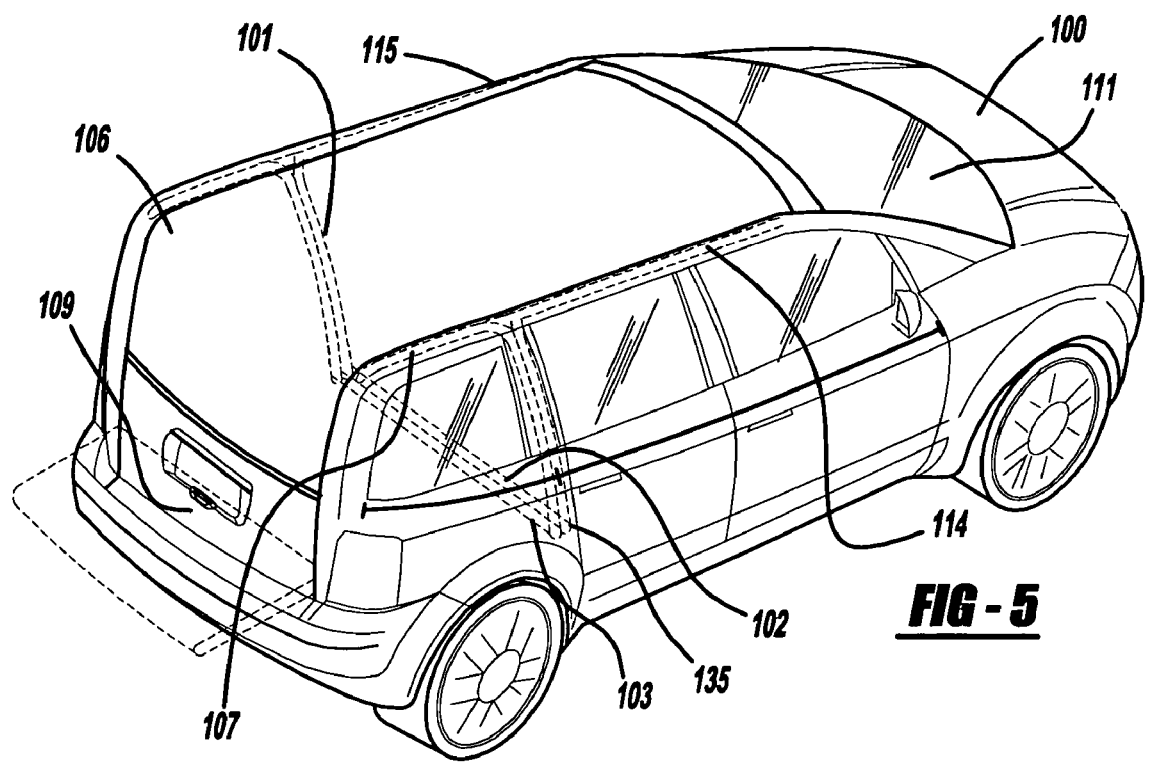
FIG. 5 is a rear perspective view of a vehicle showing an alternate embodiment of open air system with a completely open roof and cargo area.
Figure 6:
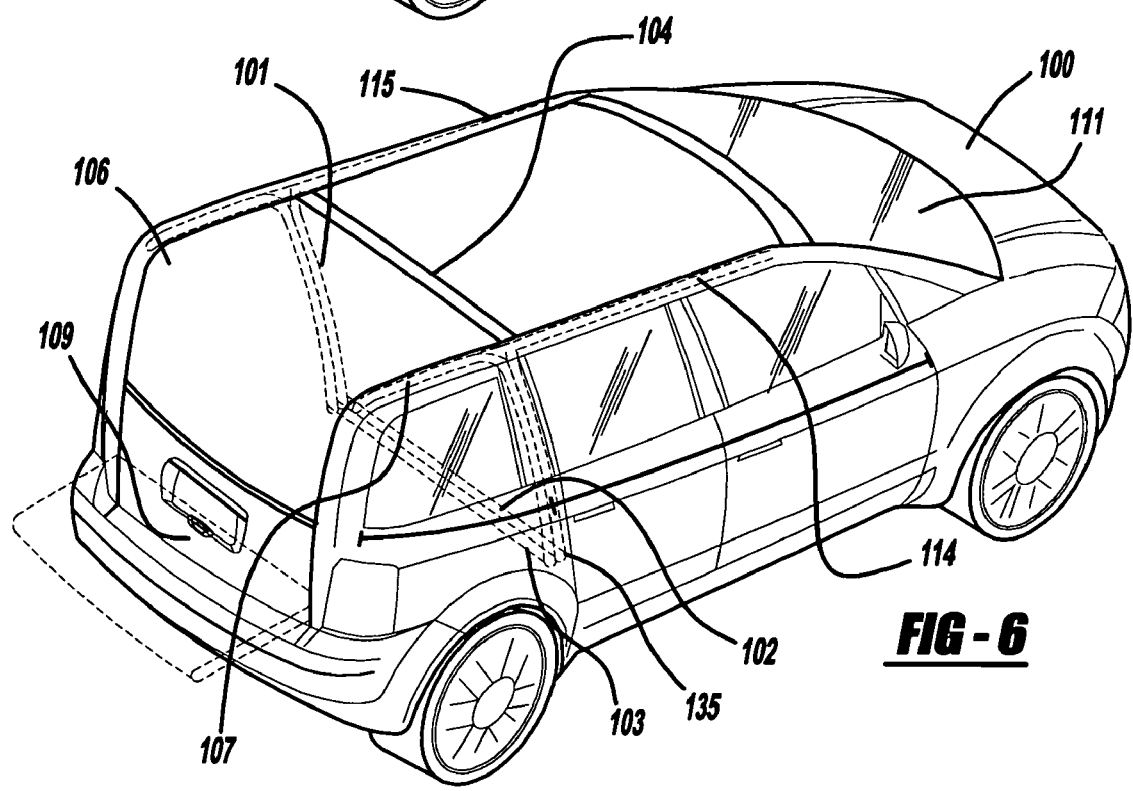
FIG. 6 is a rear perspective view of a vehicle showing a first preferred embodiment of an open air system with a completely open roof and cargo area.

Referring to FIGS. 5 and 6, both the front roof section 102 and the back roof section 103 are completely open and are retracted to the floor of the vehicle. In some embodiments, the roof section 102, 103 may be retracted in a stowaway area 135 below the floor and may be concealed by a door or shutter.

Material for flexible roof may be traditional soft top materials that are used in the soft top industry, such as canvas, nylon blends and the like. Characteristics for the fabric include flexibility such that the fabric does not impede movement of the roof; durability such that movement of the roof does not destroy fabric; and weatherability such that outside elements of mainly moisture are not allowed to enter the interior of the vehicle through fabric. Roof may also comprise an interior headliner and padding between the outer fabric and the headliner. In certain preferred embodiments, material that is used for the roof is chosen such that a knife or other sharp object may not cut through the material. In such embodiments, the material is advantageous over standard fabrics used as soft top fabrics since the material prevents unwanted entry into the car by cutting, thus deterring theft. Other advantages include use of open air system 101 in a configuration such that roof is a barrier between cargo area and passenger compartment. In such a configuration, the material may prevent cargo stowed in the cargo area from puncturing, ripping or penetrating through the wall, especially when a vehicle stops suddenly. In such embodiments, examples of materials that may be used include Kevlar®, aramid fibers, certain carbon fibers and weaves including such fibers. In such embodiments, the material may include nylon or other such traditional fabric fibers cross woven with a Kevlar®, an aramid fiber, a carbon fiber or the like and combinations thereof. Developed by DuPont, fibers of Kevlar® consist of long molecular chains produced from poly-paraphenylene tetraphthalamide. Kevlar® may also be described as a para-aramid nylon, an aramid fiber, or an aromatic polyamide. In alternative embodiments, a traditional soft top fabric may be used with an additional layer of a metal mesh or carbon fiber mesh underneath the fabric to accomplish the similar results of preventing puncturing, tearing, cutting and the like of the roof.

Figure 8:
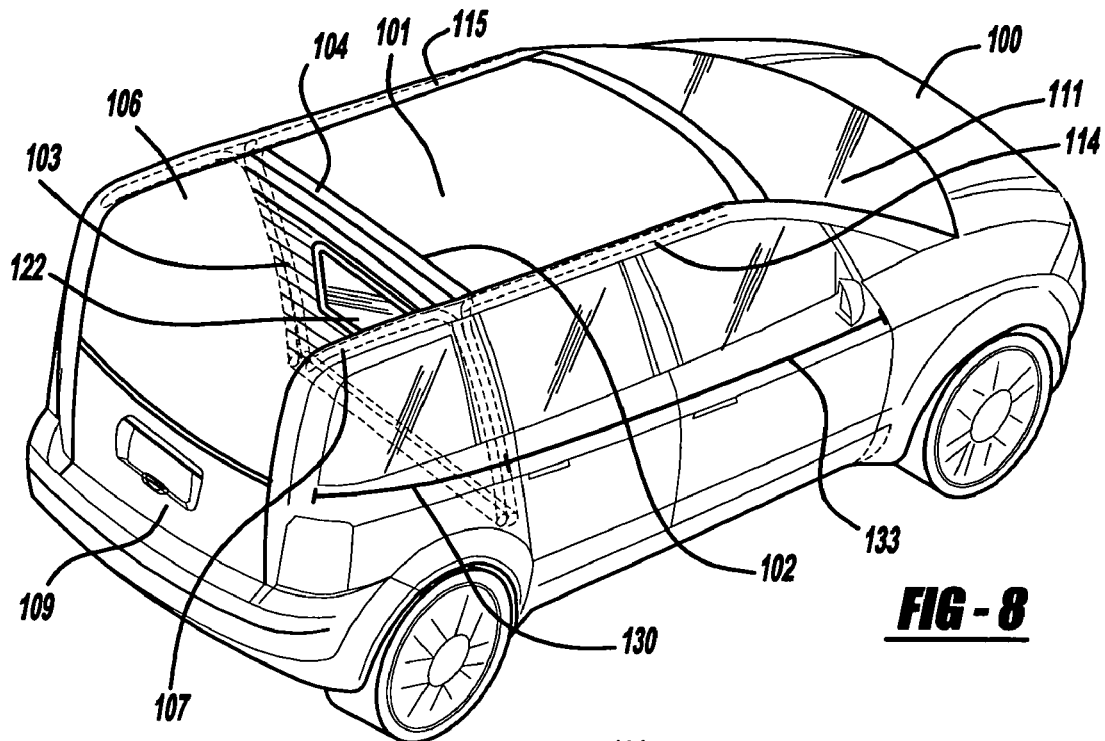
FIG. 8 is a rear perspective view of a vehicle showing a second preferred embodiment of an open air system with opened roof with a barrier between the passenger and cargo compartments.

With reference to FIGS. 7 and 8, various embodiments of open air system 101 may comprise a transparent panel. In such embodiments, transparent panel has flexible characteristics similar to roof such that transparent panel does not impede the movement of the roof. Transparent panel may be advantageous since in configurations where roof becomes a barrier between cargo area and passenger compartment. The barrier may have transparent panel as a back window allowing the driver to use a rear view mirror as shown in FIG. 8.

Figure 9:
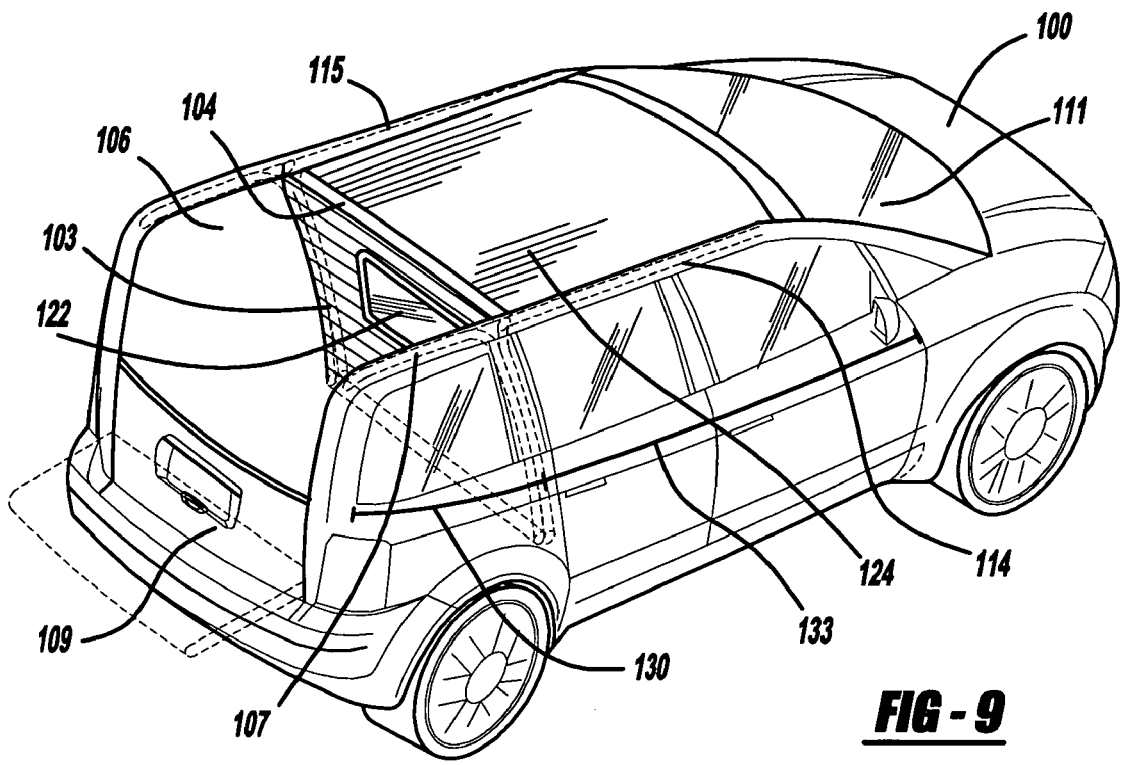
FIG. 9 is a rear perspective view of a vehicle showing a third preferred embodiment of an open air system with an open cargo area and a fixed roof over the passenger compartment.
Figure 17:
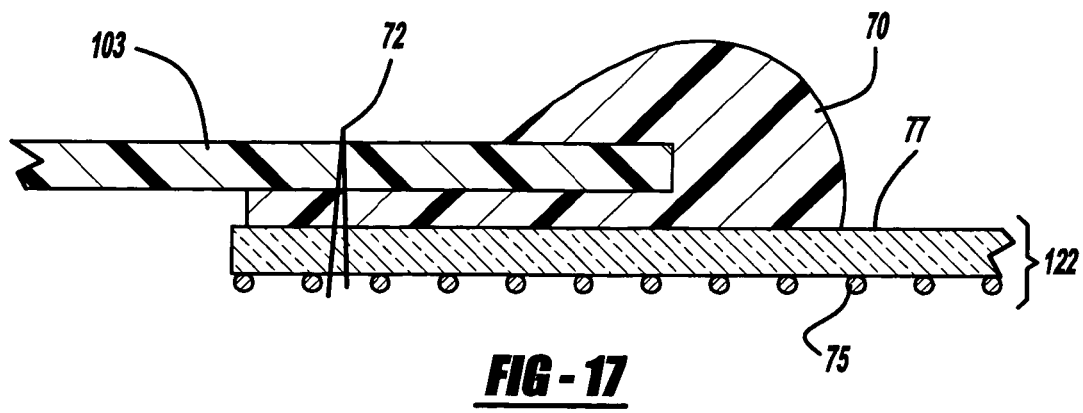
FIG. 17 is a cross sectional view of FIG. 16 along line 17—17 of FIG. 16.

FIGS. 17 and 18 show detail of transparent panel 122. In such embodiments, roof panel 103 has clear panel 122 attached to it. Seal 70 is included to prevent water from entering the vehicle. Seal 70 and transparent panel 122 may be bonded to roof panel 103 or may be sewn to roof 103 at point 72. Alternatively, transparent panel 122 may be both bonded and sewn to roof panel 103. In some preferred embodiments, transparent panel 122 may consist of a transparent material 74 and a mesh material 75. In such embodiments, mesh material may be a carbon fiber weave, a Kevlar® material weave, a metal mesh or the like such that mesh material 75 prevents the cutting or tearing of transparent panel 122 and yet allows driver to see through panel 122 with rear view mirror. In such embodiments, transparent panel includes mesh 75 and may be used with the material described above having characteristics of being able to withstand cutting and tearing. Open air system with transparent panels may prevent an intruder from cutting through a transparent panel and entering the vehicle and thus deterring theft. In such embodiments, transparent panel 122 comprising mesh 75 may prevent cargo from ripping through transparent panel 122 when a vehicle stops suddenly when roof is in the configuration of a barrier as illustrated in FIGS. 8 and 9.

Figure 10A:
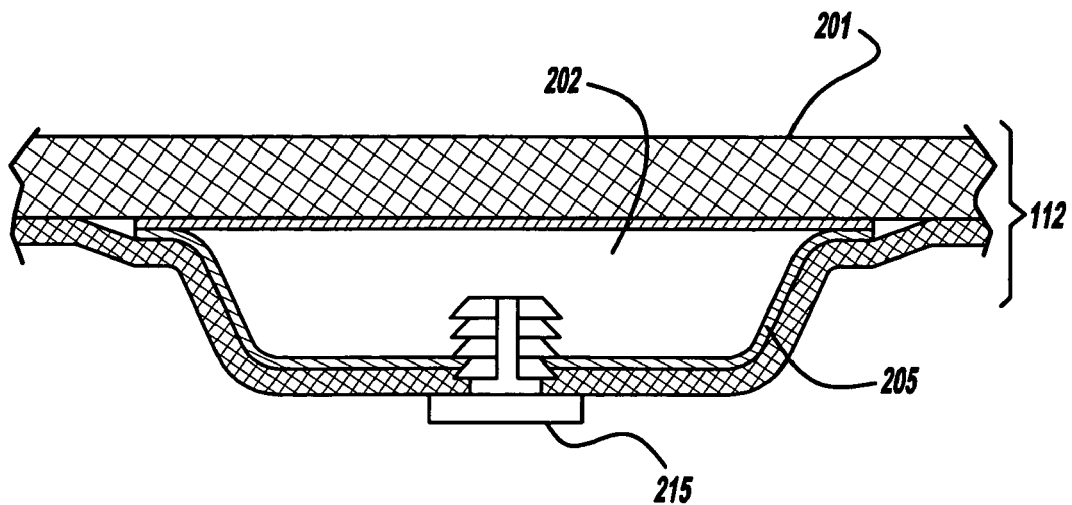
FIGS. 10A and 10B are cross sectional views of FIG. 1 along line 10—10 showing a first and a second preferred embodiment of a roof cross bow area.

FIG. 10A is a cross sectional view of FIG. 1 along line 10—10 showing a first preferred embodiment of a cross bow holding roof panel 102. This cross sectional view illustrates cross bow 202 which is attached to an outer material 201 and is also attached to an interior headliner 205 by employing fastener 215.

Figure 10B:
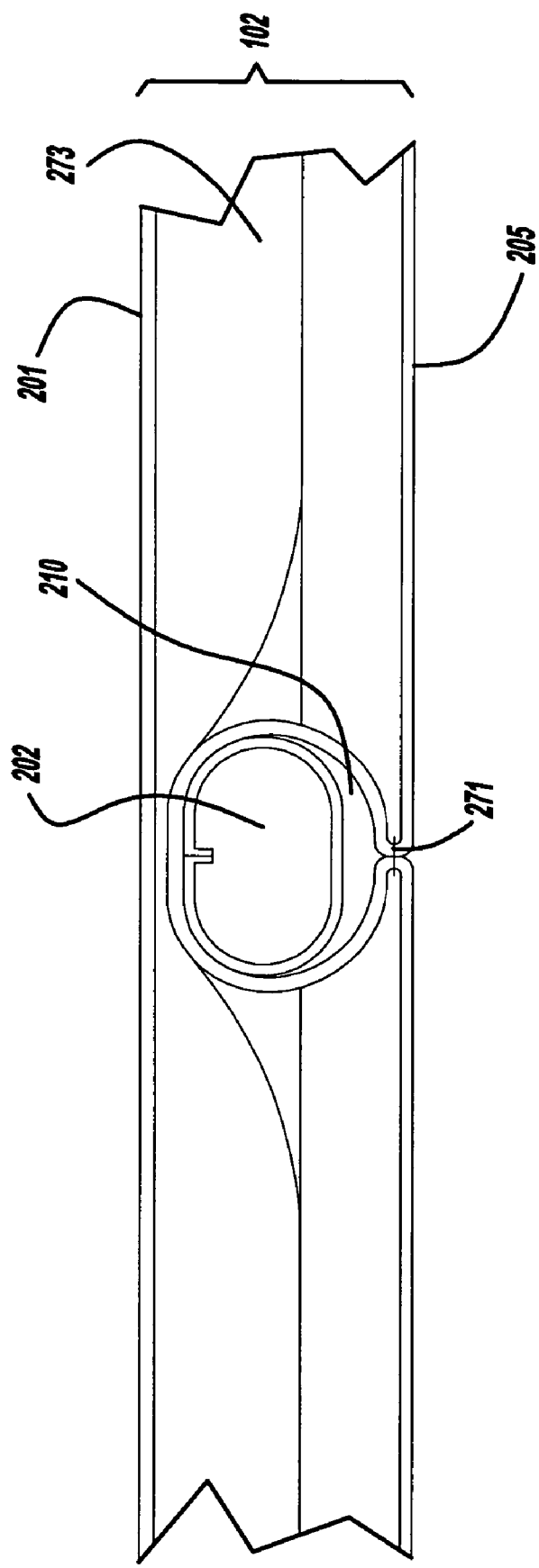
Figure 15:
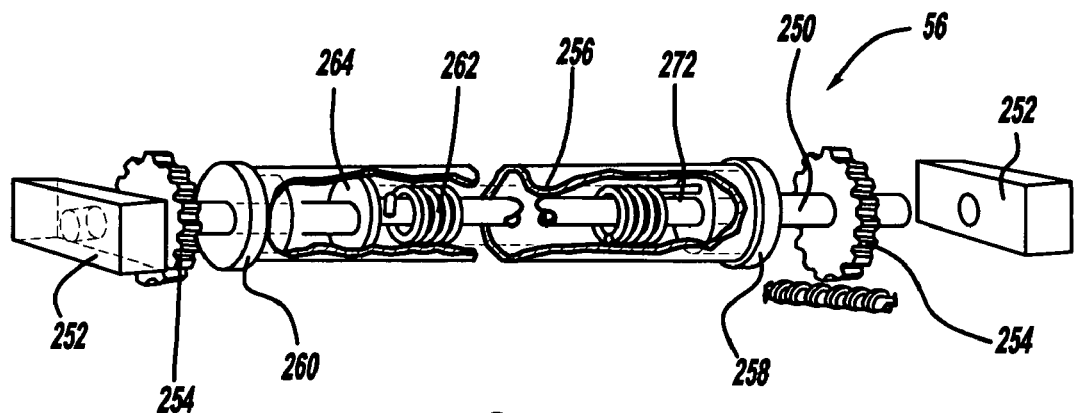
FIG. 15 is an exploded perspective view showing a preferred embodiment of roller system and movement of flexible roof.

FIG. 10B shows a cross section of an alternative preferred embodiment of cross bow which may be fabricated from aluminum, plastic, carbon fiber, alloy or the like. In such embodiments, a headliner material 205 includes a seam 271 that creates a pocket 271 around cross bow 450. Such pocket 270 attaches cross bow 202 to roof 102. Roof 102 includes outer surface 201 which is designed to withstand the elements and keep the vehicle dry inside. Roof 102 also comprises padding 273. Such padding 273 is advantageous to dampen sound as well as retain heat or air conditioning, thus providing a more comfortable environment for occupants of the vehicle. In some embodiments, headliner 205 may be designed to match the interior of the vehicle.

As shown in FIG. 11, this is cross sectional detail of FIG. 1 front header 436 along the line 11—11. Roof 102 engages seal 430 when roof is closed, thus forming a seal preventing wind, moisture, dirt and other environmental stresses from entering interior of vehicle when roof is closed. Roof system is attached to vehicle frame 436 by the fastening of slide rail 444 which is fastened by fastener 432 though hole 439 of frame 436. Fastener 432 may be a bullet push on fastener, a lock tight fastener, a screw, a bolt, a rivet, a weld or any such fastener known to one skilled in the art. In an alternative embodiment, roof system is attached to vehicle frame 436 by an adhesive 438. In such embodiments, member 432 may be a pin that is aligned in hole 439 for proper alignment of roof system when bonded to vehicle frame 436 by adhesive 438. In other alternative embodiments, roof system may be attached to vehicle frame using both a fastener 432 and adhesive 438. End bow 434 may include fastener 433 which holds outer surface 201 of roof 102 at point 435. In the cavity area 442, a wind deflector may be positioned for application on the front header so that wind may be deflected from the interior of the vehicle when the roof is open. Wind deflectors, as well as other seals, drive mechanisms, guide tracks, sliders, etc. that may be used in various embodiments of open air system 101, are described in U.S. Provisional Application No. 60/580,584, filed on Jun. 17, 2004; U.S. Provisional Application No. 60/642,378 filed on Jan. 7, 2005; and U.S. Provisional Application No. 60/676,605 filed on Apr. 29, 2005, as well as U.S. application Ser. No. 11/154,750 entitled "Automotive Vehicle Open Air System" to MacNee, filed on Jun. 16, 2005; U.S. application Ser. No.11/154,546, entitled "Automotive Vehicle Open Air System" to Reitzloff et al., filed on Jun. 16, 2005; and U.S. Application Ser. No. 11/154,657 entitled "Automotive Vehicle Open Air System" to Urban et al., filed on Jun. 16, 2005; all of which are incorporated herein in their entirety.

Figure 12:
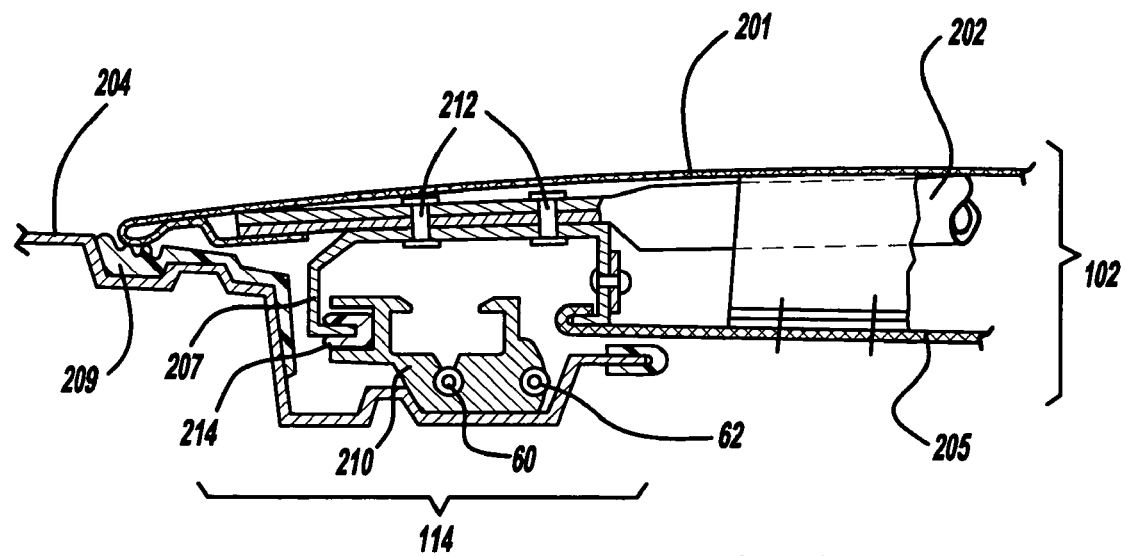
FIG. 12 is a cross sectional view of FIG. 1 along line 12—12 showing a preferred embodiment of tracks and drive mechanisms.
Figure 16:
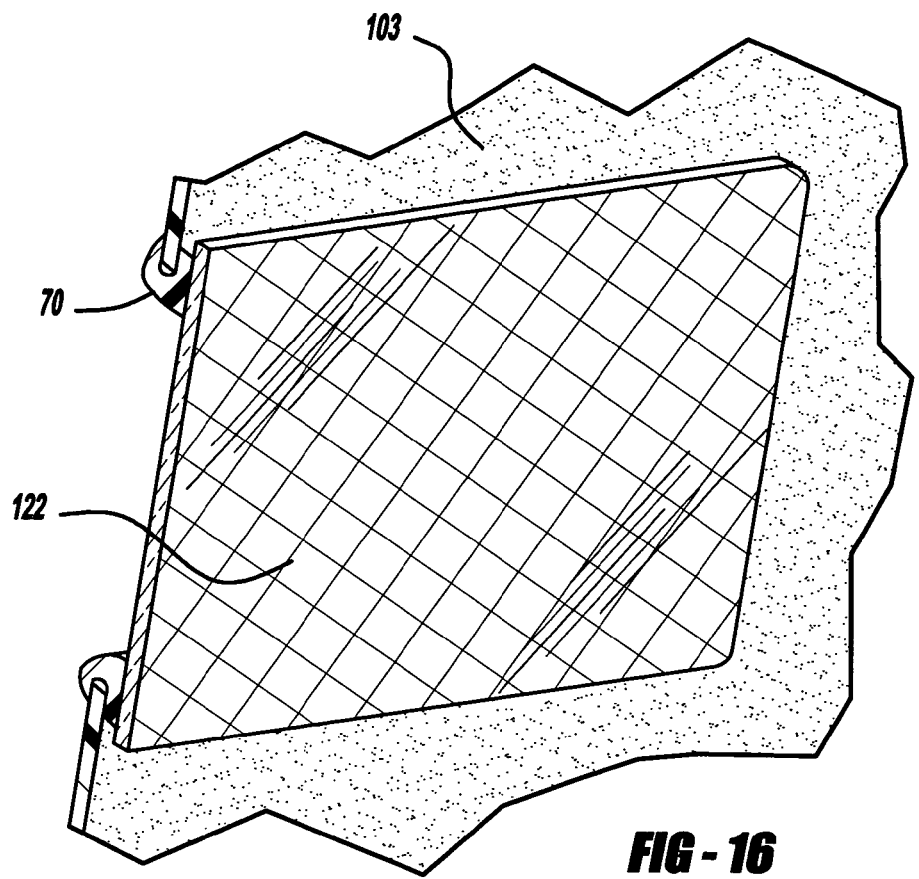
FIG. 16 is a fragmentary perspective view of a preferred embodiment of flexible window.

FIG. 12 is a cross sectional view along line 12—12 of FIG. 1. Roof panel 102 includes cross bow 202, outer cover 201, and headliner 205. Cross bow 202 is attached to slider 207 by fasteners 212. Track 114 includes cable drives 60, 61, seal 209 and slider guide 210. Slider 207 includes anti-friction pad 214 which may also assist in positioning the slider 207 on guide 210. Slider 207 is operably coupled to at least one cable drive. Cable drives are driven by at least one motor that is located in the front header of vehicle 100 and control by an electronic control unit (ECU). ECU includes an operator interface that an occupant of vehicle can utilize to operably open and close roof panel. This embodiment of track 114 is mirrored for track 115 may also be used for tracks 107 and 106. Open air roof system includes seal 209 which is along the vehicle outer rail 204 and operably seals roof 102 such that rain, snow, sleet, dirt and other unwanted elements of nature enter the interior of the vehicle. In some embodiments, seal 209 may be a double bulb seal.

With reference to FIGS. 13–16, roller mechanism 56 has an inner shaft 250, a pair of nylon bearing surfaces 252, a pair of helical gears 254, an outer tube 256, a first end cap 258, a second end cap 260, a torsion spring 262 and a urethane disk 264. Inner shaft 250 is preferably a ⅜ inch diameter steel tube having ends which are journalled for rotation within bearing surfaces 252. Helical gears 254 are rotatably coupled to inner shaft 250 and are each in meshed engagement with a corresponding cable 58. Cable 58 is preferably a *wire-wound*, flocked cloth and flexible wire core *construction*. T*hus*, each cable 58 can be operably pushed or *pulled*. End caps 258 and 260 are journalled for rotation about inner shaft 250. End caps are preferably made from a nylon material and are press fit onto the ends of an aluminum outer tube 256. Additionally, outer tube 256 is crimped onto each end cap 258 and 260. Torsion spring 262 has a first end 270 coupled to inner shaft 250 and has a second end 272 secured to end cap 258. Thus, torsion spring 262 maintains roof panel 102 in a taut manner when roof panel 102 is in its functional *position*. Also, torsion spring 262 serves to prevent undesirable rattles within roof cross bows and roof panel 102 when in their stowed position wrapped around roller mechanism 56. Torsion spring 262 further serves to accommodate the change in angular velocity of the tube 256 as material rolls on and off the tube as compared to the relatively constant linear velocity of cable 58. Disk 264 serves to maintain the appropriate spacing between inner shaft 250 and outer tube 256. Of course, roller mechanism 56 may only provide a single helical gear 254.

Figure 18A:
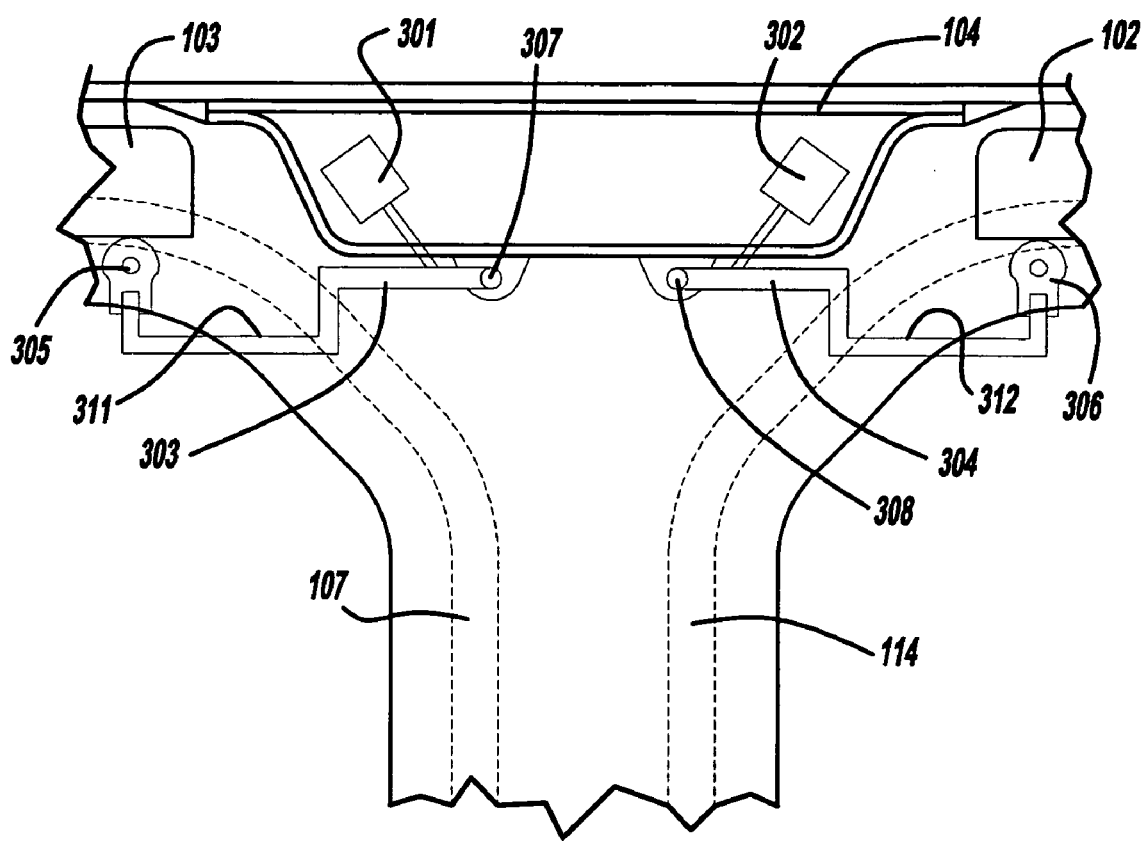
FIGS. 18A–18C are a cross sectional view of FIG. 1 along line x—x showing a first preferred embodiment of track system.
Figure 18B:
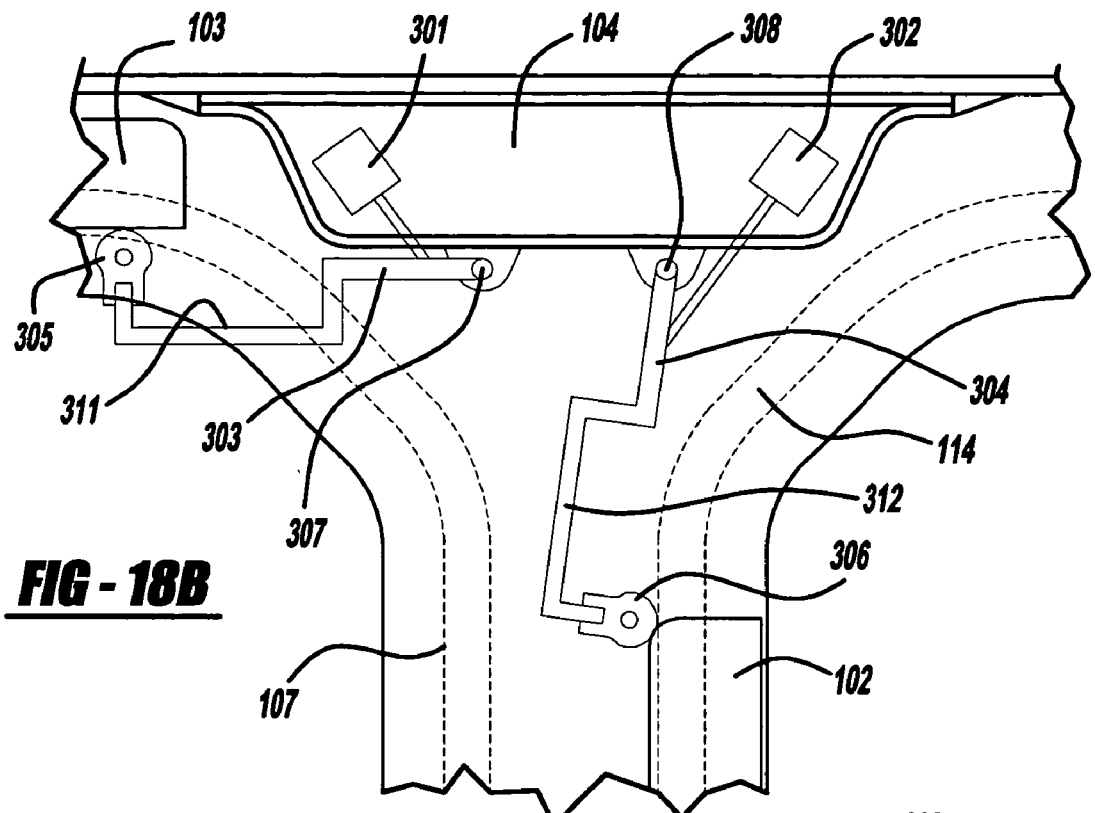
Figure 18C:
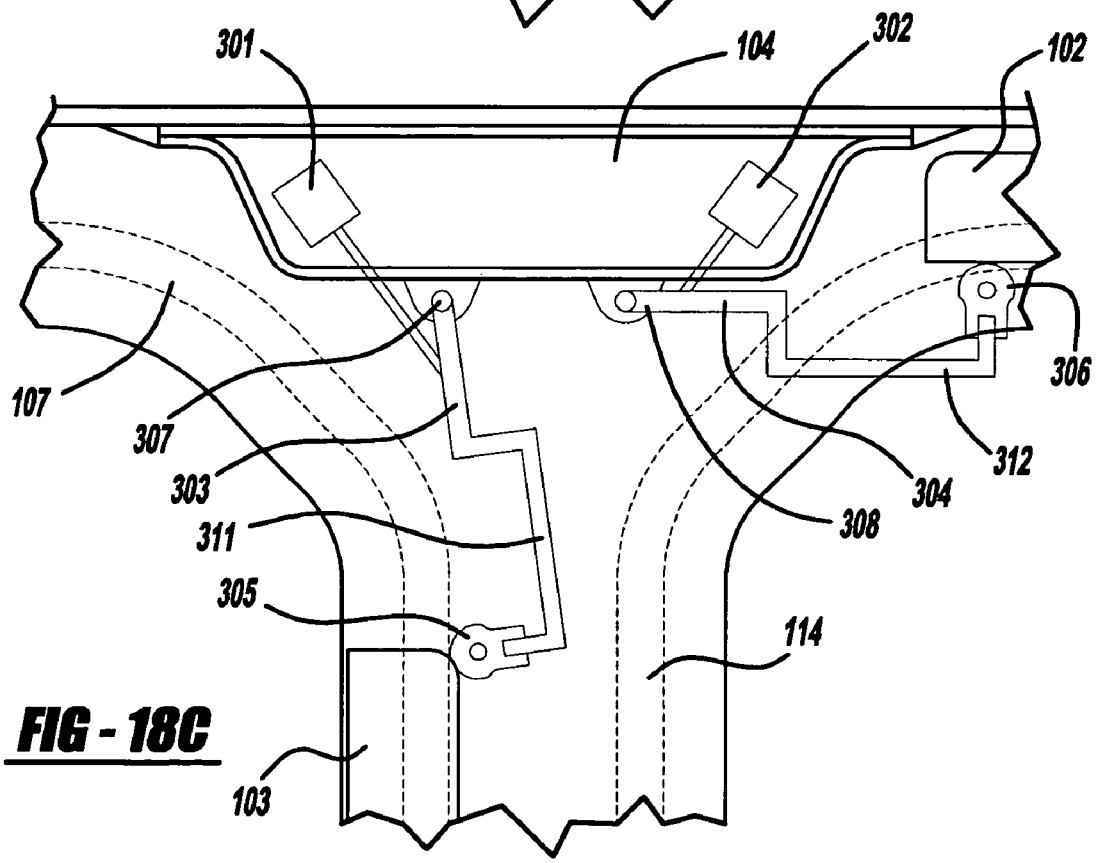

FIGS. 18A–18C are a cross sectional view of FIG. 1 along line x—x showing a first preferred embodiment of track system. Turning FIG. 18A, open air system is shown with both front roof panel 102 and rear roof panel 103 closed. Connected to cross vehicle beam 104 are two switching mechanisms which include solenoid/actuator 301,302, pivot point 307, 308 and arm 303, 304 which further includes drain trough 311, 312 and seal 305, 306. As illustrated in 18B, when front roof panel 103 is opened, front roof panel 103 is moved slightly forward, then solenoid/actuator 302 moves arm 312 down and front roof panel 102 able to be retracted down track 114. Closing front roof panel 102 is just the opposite, front roof panel 102 is raised until it is covering vehicle then solenoid/actuator 302 moves arm 312 up and front roof panel 102 able to be positioned in a closed and sealed position. As illustrated in 18C, when rear roof panel 102 is opened, rear roof panel 102 is moved slightly forward, then solenoid/actuator 301 moves arm 311 down and rear roof panel 103 able to be retracted down track 107. Closing rear roof panel 103 is just the opposite, rear roof panel 103 is raised until it is covering vehicle then solenoid/actuator 301 moves arm 311 up and rear roof panel 103 able to be positioned in a closed and sealed position. Mirrored images of the switching mechanism are on tracks 115, 106 that are on the other side vehicle 100. If both front and rear roof panels 102, 103 are to be opened then the both the steps in FIGS. 18B and 18C are followed. Water from top of roof panel 102, 103 is collected in drain troughs 311, 312 and then moved off vehicle 100.

Figure 19A:
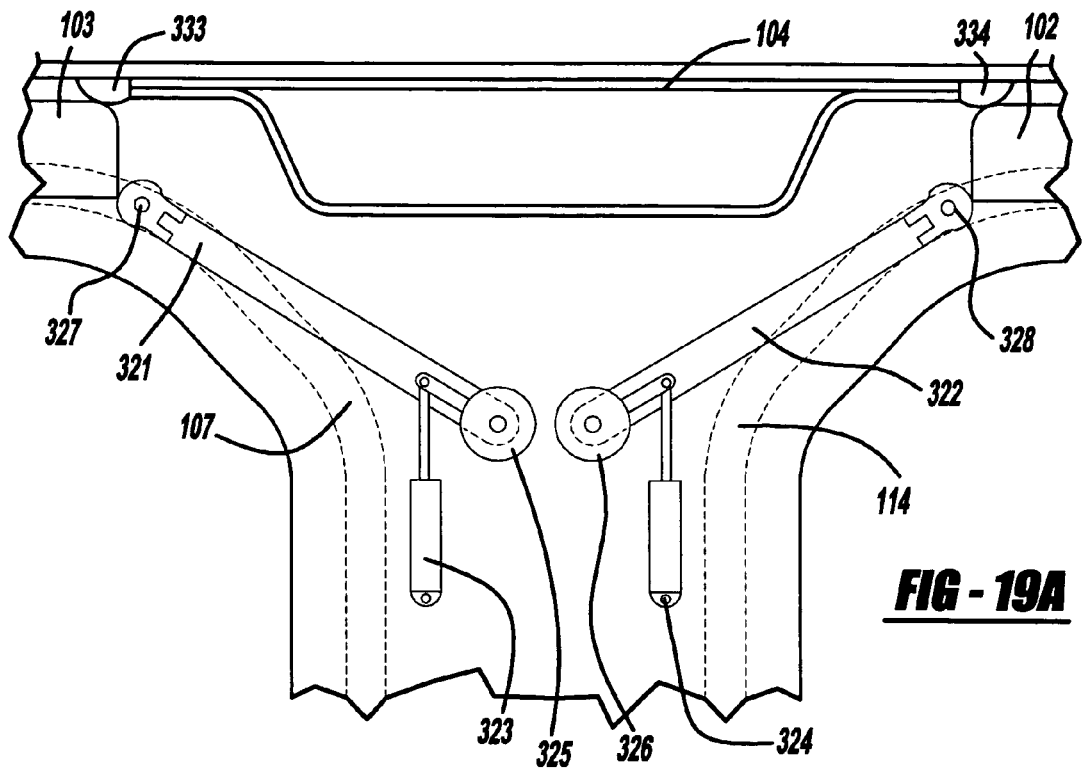
FIGS. 19A–19C are cross sectional views of FIG. 1 along the line x—x showing a second alternative preferred embodiment of track system.
Figure 19B:
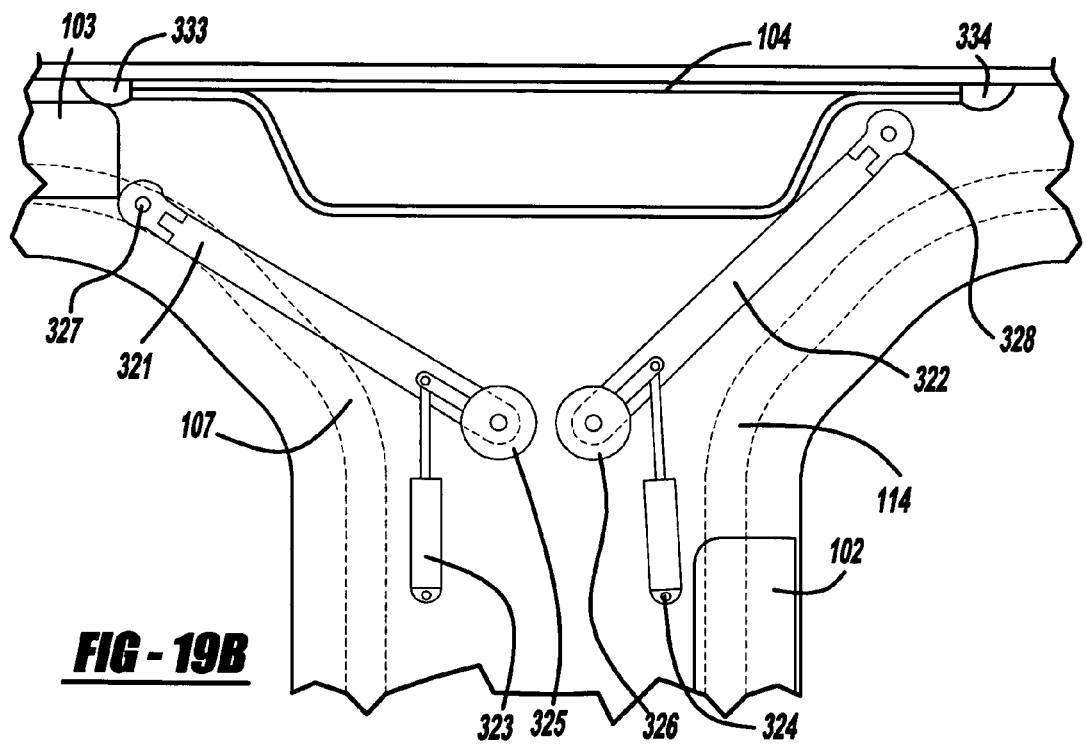
Figure 19C:
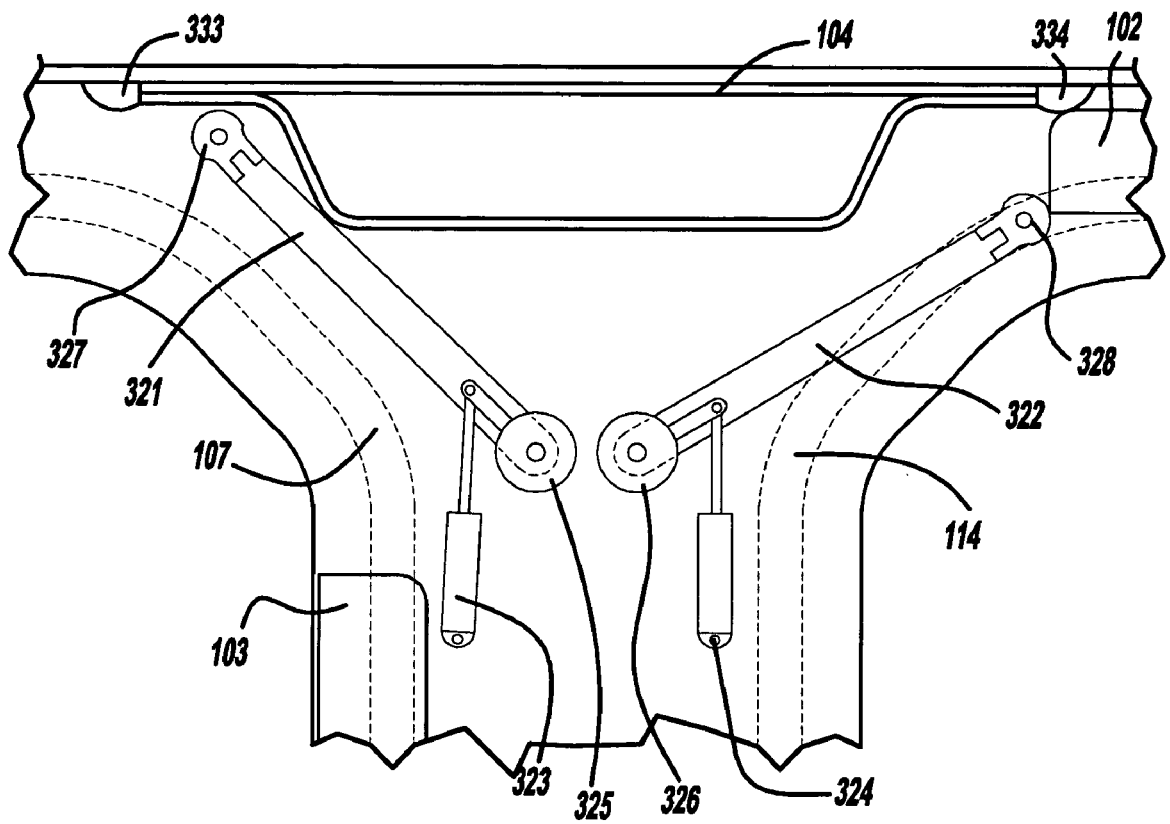

FIGS. 19A–19C are cross sectional views of FIG. 1 along the line x—x showing a second alternative preferred embodiment of track system. Turning FIG. 19A, open air system is shown with both front roof panel 102 and rear roof panel 103 closed. Connected to cross vehicle beam 104 are two switching mechanisms which include linear motor 323, 324, pivot point 325, 326 and arm 321, 322. As illustrated in 19B, when front roof panel 103 is opened, linear motor 324 moves arm 322 up and front roof panel 102 is able to be retracted down track 114. Closing front roof panel 102 is just the opposite, front roof panel 102 is raised until it is covering and then vehicle lift arm 322 is moved down into a locking position and front roof panel 102 is closed and sealed against seal 334. As illustrated in 19C, when rear roof panel 102 is opened, linear motor 323 moves arm 321 up and rear roof panel 103 is able to be retracted down track 107. Closing rear roof panel 103 is just the opposite, rear roof panel 103 is raised until it is covering vehicle and then lift arm 321 is moved down into a locking position and rear roof panel 102 is closed and sealed against seal 333. Mirrored images of the switching mechanism are on tracks 115, 106 that are on the other side vehicle 100. If both front and rear roof panels 102, 103 are to be opened then the both the steps in FIGS. 19B and 19C are followed.

Figure 20A:
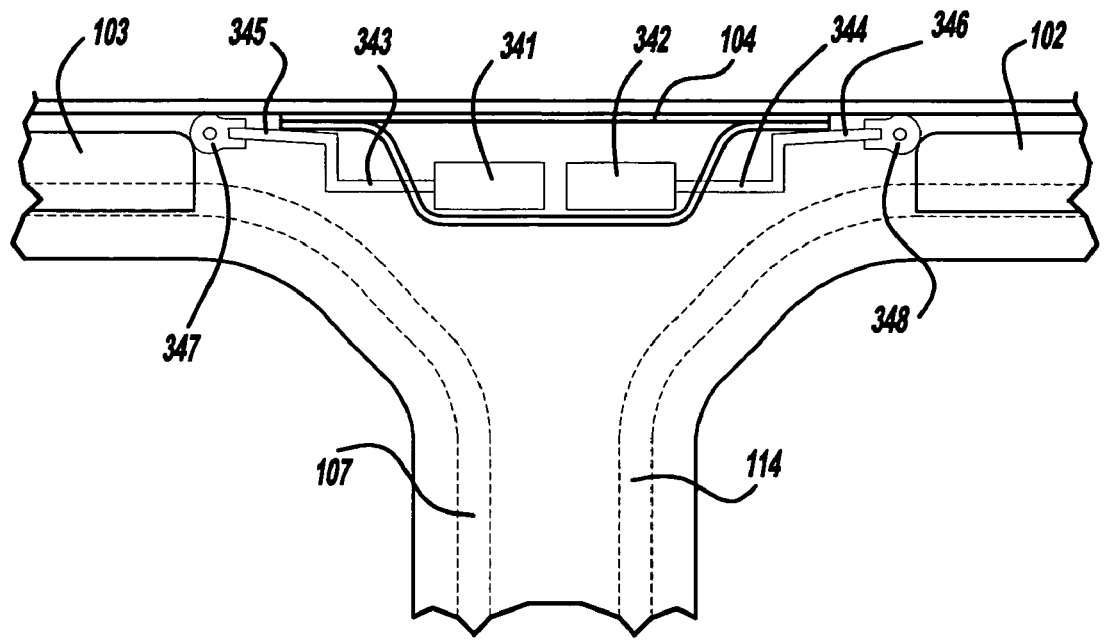
FIGS. 20A–20C are cross sectional views of FIG. 1 along line x—x showing a third preferred embodiment of track system.
Figure 20B:
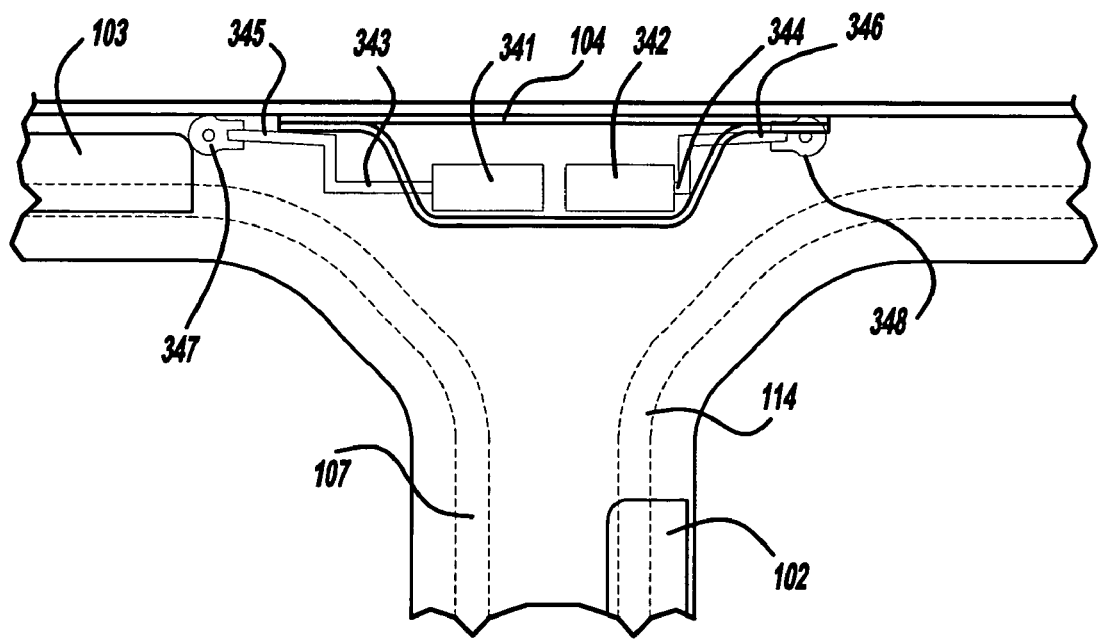
Figure 20C:
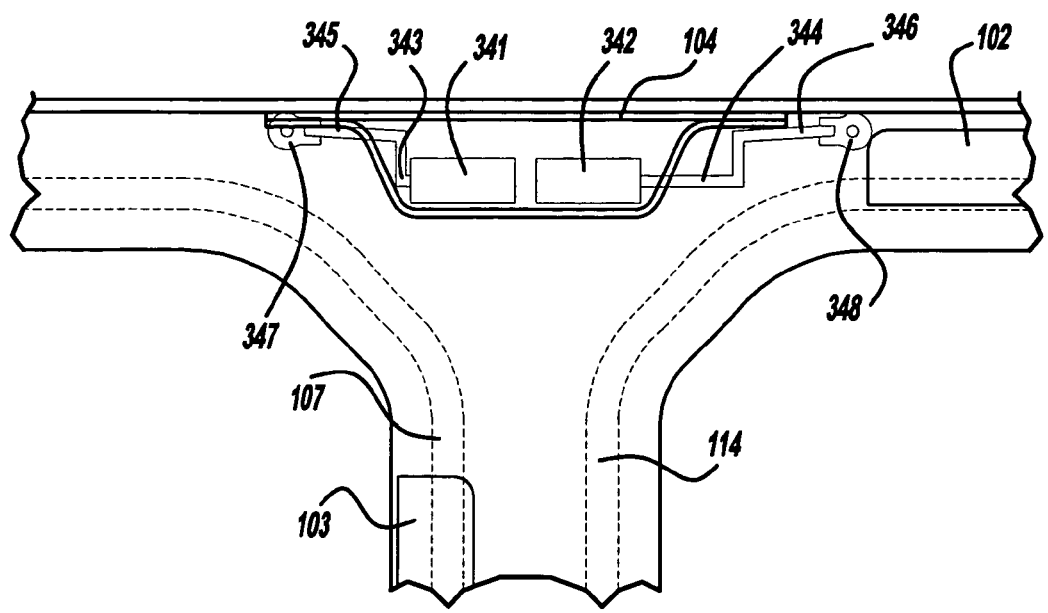

FIGS. 20A–20C are cross sectional views of FIG. 1 along line x—x showing a third preferred embodiment of track system. Turning FIG. 20A, open air system is shown with both front roof panel 102 and rear roof panel 103closed. Connected to cross vehicle beam 104 are two switching mechanisms which include solenoid/actuator 341,342, and arm 345, 346 which further includes drain trough 343, 344 and seal 347, 348. As illustrated in 20B, when front roof panel 103 is opened, solenoid/actuator 342 moves arm 346 back and front roof panel 102 able to be retracted down track 114. Closing front roof panel 102 is just the opposite, front roof panel 102 is raised until it is covering vehicle then solenoid/actuator 342 moves arm 3346 forward and front roof panel 102 is locked in a closed and sealed position. As illustrated in 20C, when rear roof panel 102 is opened, rear solenoid/actuator 341 moves arm 345 forward and rear roof panel 103 able to be retracted down track 107. Closing rear roof panel 103 is just the opposite, rear roof panel 103 is raised until it is covering vehicle then solenoid/actuator 341 moves arm 345 back and rear roof panel 103 is locked in a closed and sealed position. Mirrored images of the switching mechanism are on tracks 115, 106 that are on the other side vehicle 100. If both front and rear roof panels 102, 103 are to be opened then the both the steps in FIGS. 18B and 18C are followed. Water from top of roof panel 102, 103 is collected in drain troughs 343, 344 and then moved off vehicle 100.

Figure 21:
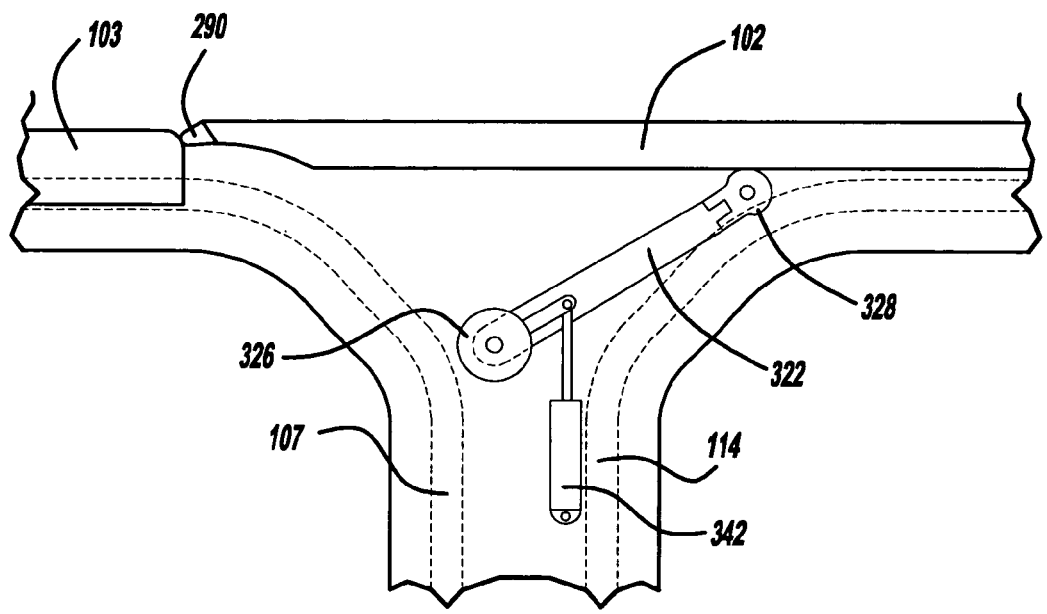
FIG. 21 is a cross sectional views of FIG. 1 along line x—x showing an alternative embodiment of track system.

FIG. 21 is a cross sectional views of FIG. 1 along line x—x showing an alternative embodiment of track system. In this embodiment, a cross vehicle member 104 is not included. Front roof panel includes seal 290 operably sealing the interface between front roof panel 102 and rear roof panel 103. Rear roof panel 103 moves freely on track and does not include a switching mechanism. When front roof panel 103 is opened, front roof panel 103 is moved slightly forward, then linear motor 324 moves arm 322 up and front roof panel 102 is able to be retracted down track 114. Closing front roof panel 102 is just the opposite, front roof panel 102 is raised until it is covering and then vehicle lift arm 322 is moved down into a locking position and front roof panel 102 is closed and sealed against rear roof panel 103. A similar embodiment may employed when front roof panel is solid and non moveable as illustrated in FIG. 9. In such an embodiment, rear roof panel 103 moves freely on track and does not include a switching mechanism. Furthermore, front roof panel would replace by rigid non moveable roof panel 124 and track 114 and switching mechanism including linear motor 342, pivot 326 and arm 326 would not be needed.

While the preferred embodiment of an automotive vehicle open air system has been disclosed herein, it should be appreciated that other variations will still fall within the scope of the present invention. For example, generally rigid rods or pulley-type cables can be employed in place of Bowden cables. Gears of the motor may directly contact a rack-like track, or a jack screw, tape drive or hydraulic mechanism can also be provided for any of the moving components. Additionally, the number and arrangement of linkages, cams, brackets, switches and electric motors can be varied as long as the functions of the present invention are achieved.

The examples and other embodiments described herein are exemplary and are not intended to be limiting in describing the full scope of apparatus, systems, compositions, materials, and methods of this invention. Equivalent changes, modifications, variations in specific embodiments, apparatus, systems, compositions, materials and methods may be made within the scope of the present invention with substantially similar results. Such changes, modifications or variations are not to be regarded as a departure from the spirit and scope of the invention. All patents cited herein are incorporated in their entirety herein by reference.

What is claimed is:

1. An open air system for a motor vehicle, the system comprising:
   a forward flexible roof section;
   at least one forward track;
   a rear flexible roof section;
   at least one rear track;
   at least one movement mechanism; and
   operably creating a barrier substantially isolating a passenger area from a cargo area by moving at least one said roof section from a first position to a second position.

2. A system according to claim 1 further comprising a transparent and flexible panel in at least one of the front roof section and the rear roof section.

3. A system according to claim 1 wherein at least one of the forward roof section and the rear roof section comprise a reinforced surface.

4. A system according to claim 3 wherein the reinforced surface comprises poly-paraphenylene tetraphthalamide, para-aramid nylon, aramid fibers, carbon fibers or combinations thereof.

5. A system according to claim 3 wherein the reinforced surface comprises a fabric outer layer and a metal mesh inner layer.

6. An open air system for a motor vehicle, the system comprising:
   a forward flexible roof section;
   at least one forward track;
   a rear flexible roof section;
   at least one rear track;
   a switching mechanism on at least one of the forward track and the rear track;
   at least one movement mechanism; and
   a barrier formed between a passenger area and a cargo area by moving the rear roof section from a first position to a second position.

7. An open air system for a motor vehicle, the system comprising:
   a forward flexible roof panel;
   at least one forward track;
   a rear flexible roof panel;
   at least one rear track;
   at least one movement mechanism; and
   at least one said roof panel always being coupled to at least one of the tracks, moving from a first position to a second position operably separating a passenger area and a cargo area.

8. A system according to claim 7 further comprising a transparent and flexible panel in at least one of the front roof panel and the rear roof panel.

9. A system according to claim 7 wherein at least one of the forward roof panel and the rear roof panel comprise a puncture resistant surface.

10. A system according to claim 9 wherein the a puncture resistant surface comprises poly-paraphenylene tetraphthalamide, para-aramid nylon, aramid fibers, carbon fibers or combinations thereof.

11. A system according to claim 9 wherein the a puncture resistant surface comprises a fabric outer layer and a metal mesh inner layer.

12. An open air system for a motor vehicle, the system comprising:
   a forward flexible roof panel;
   at least one forward track;
   a rear flexible roof panel;
   at least one rear track;
   a switching mechanism on at least one of the forward track and the rear track;
   at least one movement mechanism; and
   a barrier formed between a passenger area and a cargo area by moving the forward roof panel from a first position to a second position.

13. An open air system for a motor vehicle, the system comprising:
   a forward roof;
   a rear flexible roof;
   at least one track;
   at least one movement mechanism; and
   at least one said roof always coupled to the at least one track and separating a passenger area and a cargo area by moving the at least one roof from a first position to a second position.

14. A system according to claim 13 further comprising a transparent and flexible panel in the rear roof.

15. A system according to claim 13 wherein the rear roof comprises a reinforced surface.

16. A system according to claim 15 wherein the reinforced surface comprises poly-paraphenylene tetraphthalamide, para-aramid nylon, aramid fibers, carbon fibers or combinations thereof.

17. A system according to claim 15 wherein the reinforced surface comprises a fabric outer layer and a metal mesh inner layer.

18. An open air system for a motor vehicle as claimed in claim 1 wherein said at least one roof section comprises;
   a flexible and reinforced roof comprising at least one of the group selected from poly-paraphenylene tetraphthalamide, para-aramid nylon, aramid fibers, metal mesh, and carbon fibers; and
   a substantially transparent, flexible, and reinforced panel in said flexible and reinforced roof, the panel comprising at least one of the group selected from poly-paraphenylene tetraphthalamide, para-aramid nylon, aramid fibers, metal mesh, and carbon fibers.

19. A system according to claim 1 further comprising an automatic actuator energizable to drive the movement mechanism between a closed position and a plurality of open positions.

20. A system according to claim 2 wherein the transparent and flexible panel is operably a back light in the barrier.

21. A system according to claim 6 an automatic actuator energizable to drive the movement mechanism between a closed position and a plurality of open positions.

22. A system according to claim 6 further comprising a transparent and flexible panel in at least one of the front roof panel and the rear roof panel.

23. A system according to claim 22 wherein the transparent and flexible panel is operably a back window.

24. A system according to claim 7 further comprising an automatic actuator energizable to drive the movement mechanism between a closed position and a plurality of open positions.

25. A system according to claim 8 wherein the transparent and flexible panel is operably a back window.

26. A system according to claim 12 further comprising an automatic actuator energizable to drive the movement mechanism between a closed position and a plurality of open positions.

27. A system according to claim 12 further comprising a transparent and flexible panel in at least one of the front roof panel and the rear roof panel.

28. A system according to claim 27 wherein the transparent and flexible panel is operably a back window.

29. A system according to claim 14 wherein the transparent and flexible panel is operably a back window.

* * * * *